(12) United States Patent
Frank

(10) Patent No.: US 12,494,823 B2
(45) Date of Patent: Dec. 9, 2025

(54) CALCULATING AN EVM OF A TRANSMITTER

(71) Applicant: Lenovo (Singapore) Pte. Ltd., New Tech Park (SG)

(72) Inventor: Colin D. Frank, Park Ridge, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 18/020,231

(22) PCT Filed: Aug. 9, 2021

(86) PCT No.: PCT/IB2021/057339
§ 371 (c)(1),
(2) Date: Feb. 7, 2023

(87) PCT Pub. No.: WO2022/029744
PCT Pub. Date: Feb. 10, 2022

(65) Prior Publication Data
US 2023/0275626 A1    Aug. 31, 2023

Related U.S. Application Data

(60) Provisional application No. 63/063,179, filed on Aug. 7, 2020, provisional application No. 63/063,163, filed on Aug. 7, 2020.

(51) Int. Cl.
*H04B 7/0413*    (2017.01)
*H04B 7/005*    (2006.01)
(Continued)

(52) U.S. Cl.
CPC ........... *H04B 7/0413* (2013.01); *H04B 7/005* (2013.01); *H04L 1/06* (2013.01);
(Continued)

(58) Field of Classification Search
CPC ......... H04B 7/005; H04B 7/0413; H04L 1/06; H04L 25/03968; H04L 2025/03426; H04L 2025/03636
See application file for complete search history.

(56) References Cited

U.S. PATENT DOCUMENTS

| 12,362,786 B2 | 7/2025 | Frank |
| 2003/0035491 A1* | 2/2003 | Walton ................. H04B 7/0626 375/267 |

(Continued)

OTHER PUBLICATIONS

PCT/IB2021/057339, "Notification of Transmittal of the International Search Report and the Written Opinion of the International Searching Authority, or the Declaration", International Searching Authority, Nov. 30, 2021, pp. 1-13.

(Continued)

*Primary Examiner* — David B Lugo
(74) *Attorney, Agent, or Firm* — Kunzler Bean & Adamson

(57) ABSTRACT

Apparatuses, methods, and systems are disclosed for calculating an EVM of a transmitter. One apparatus includes a processor and a receiver that receives a multiple-layer MIMO signal from a transmitter via a propagation channel. The processor measures the received multiple-layer MIMO signal using an unbiased linear MMSE MIMO equalizer and calculates an EVM of the transmitter, where the EVM for each transmission layer is calculated as 100 times the square root of the mean square error of the layer estimate at the output of the unbiased linear MMSE MIMO equalizer.

20 Claims, 8 Drawing Sheets

(51) Int. Cl.
  *H04L 1/06* (2006.01)
  *H04L 25/03* (2006.01)
(52) U.S. Cl.
  CPC .................. *H04L 25/03057* (2013.01); *H04L 2025/03426* (2013.01); *H04L 2025/03636* (2013.01)

(56) References Cited

U.S. PATENT DOCUMENTS

| | | | |
|---|---|---|---|
| 2009/0196224 | A1 | 8/2009 | Zhang et al. |
| 2013/0058427 | A1* | 3/2013 | Bai ..................... H04L 27/0012 375/285 |
| 2013/0238262 | A1 | 9/2013 | Asami |
| 2016/0352362 | A1 | 12/2016 | Fonseka et al. |
| 2017/0214429 | A1 | 7/2017 | Eistein et al. |
| 2018/0375597 | A1 | 12/2018 | Sur et al. |
| 2023/0171797 | A1* | 6/2023 | Bao ..................... H04L 5/0048 370/329 |

OTHER PUBLICATIONS

PCT/IB2021/057343, "Notification of Transmittal of the International Search Report and the Written Opinion of the International Searching Authority, or the Declaration", International Searching Authority, Dec. 2, 2021, pp. 1-13.
Qualcomm Inc., "TX EVM test condition correction for ULMIMO", 3GPP TSG-RAN WG4 Meeting #93 R4-1913226, Nov. 18-22, 2019, pp. 1-3.
Qualcomm Inc., "FR1 TX EVM test condition correction for ULMIMO", 3GPP TSG-RAN WG4 Meeting #94-e R4-2000204, Feb. 24-Mar. 6, 2020, pp. 1-4.
Huawei et al., "On UL MIMO TX EVM requirement", 3GPP TSG-RAN WG4 Meeting #94-e-Bis R4-2004734, Apr. 20-30, 2020, pp. 1-2.
Motorola Mobility, "EVM Definitions for Antenna Ports and MIMO Layers", 3GPP RAN4#94-e-Bis R4-2004791, Apr. 20-30, 2020, pp. 1-5.
Qualcomm Inc., "FR1 TX EVM test condition correction for ULMIMO", 3GPP TSG-RAN WG4 Meeting #94-e-Bis R4-2004866, Apr. 20-30, 2020, pp. 1-3.
Qualcomm Inc., "CR to 38.101-1: Revision to ULMIMO EVM spec", 3GPP TSG RAN WG4 #95-e R4-2006777, May 25-Jun. 5, 2020, pp. 1-2.
Motorola Mobility, "On the Transmit EVM Requirement for UL MIMO Transmission", 3GPP TSG-RAN WG4 Meeting RAN4#95-e R4-2008057, May 25-Jun. 5, 2020, pp. 1-4.
Huawei et al., "On UL MIMO TX EVM requirement", 3GPP TSG-RAN WG4 Meeting #95-e R4-2008214, May 25-Jun. 5, 2020, pp. 1-2.
Motorola Mobility, "Considerations on the EVM Definition for an Antenna Port or a Single MIMO Layer", 3GPP TSG-RAN WG4 Meeting RAN4#95-e R4-2008276, May 25-Jun. 5, 2020, pp. 1-5.
Motorola Mobility, "WF on EVM Requirement for UL MIMO Transmission", 3GPP TSG-RAN WG4 Meeting RAN4#95-e R4-2008404, May 25-Jun. 5, 2020, pp. 1-4.
Qualcomm, "WF on Enabling Transparent TxD in Rel-16", 3GPP TSG-RAN WG4 Meeting #95-e R4-2008465, May 25-Jun. 5, 2020, pp. 1-9.
Lenovo et al., "Further Considerations on the EVM Definition for Antenna Ports Including Transparent Transmit Diversity", 3GPP TSG-RAN WG4 Meeting RAN4#96-e R4-2011519, Aug. 17-28, 2020, pp. 1-9.
Lenovo et al., "On the Transmit EVM Requirement for UL MIMO Transmission", 3GPP TSG-RAN WG4 Meeting RAN4#96-e R4-2011520, Aug. 17-28, 2020, pp. 1-9.
3GPP, "3rd Generation Partnership Project; Technical Specification Group Radio Access Network; NR; User Equipment (UE) conformance specification; Radio transmission and reception; Part 1: Range 1 Standalone; (Release 16)", 3GPP TS 38.521-1 V16.4.0, Jun. 2020, pp. 1-274.
3GPP, "3rd Generation Partnership Project; Technical Specification Group Radio Access Network; NR; User Equipment (UE) conformance specification; Radio transmission and reception; Part 1: Range 1 Standalone; (Release 16)", 3GPP TS 38.521-1 V16.4.0, Jun. 2020, pp. 275-500.
U.S. Appl. No. 18/020,239 "Office Action Summary", USPTO, Nov. 15, 2024, pp. 1-16.
U.S. Appl. No. 18/020,239 "Office Action Summary", USPTO, Jun. 28, 2024, pp. 1-21.

* cited by examiner

CALCULATING AN EVM OF A TRANSMITTER

CROSS-REFERENCE TO RELATED APPLICATIONS

This application claims priority to U.S. Provisional Patent Application No. 63/063,179 entitled "TRANSMITTER EVM DEFINITION FOR MULTI-LAYER TRANSMISSION" and filed on Aug. 5, 2020 for Colin D. Frank, which application is incorporated herein by reference. This application also claims priority to U.S. Provisional Patent Application No. 63/063,163 entitled "TRANSMITTER EVM DEFINITION FOR AN ANTENNA PORT" and filed on Aug. 5, 2020 for Colin D. Frank, which application is incorporated herein by reference.

FIELD

The subject matter disclosed herein relates generally to wireless communications and more particularly relates to configurations for transmitter Error Vector Magnitude ("EVM") definition for a multi-layer transmission.

BACKGROUND

In wireless communication devices, phase and amplitude distortion created by the power amplifier directly affects the quality of the communication. The most significant measurement for analyzing power amplifier performance in the latest communication system protocols is Error Vector Magnitude ("EVM"). This is a measure of modulation accuracy, or how well the power amplifier is transmitting information, represented by the varying phase and amplitude of an RF signal. EVM measurements lend insight into the communication link and are the key measure of transmitter performance.

However, due to leakage between the antennas within the UE, it seems that it is not possible to measure the EVM for the antenna connectors independently even in the case that the antenna precoder is the identity matrix. If the EVM is measured without addressing the leakage between the two antennas, the EVM requirement cannot be met.

BRIEF SUMMARY

Disclosed are procedures for calculating an EVM of a transmitter. Said procedures may be implemented by apparatus, systems, methods, or computer program products.

One method for calculating an EVM of a transmitter includes generating a multiple-layer transmission signal for Multiple-Input, Multiple-Output ("MIMO") and transmitting the generated multiple-layer transmission signal via a propagation channel using a transmitter. The method includes measuring the transmitted multiple-layer transmission signal using an unbiased linear minimum mean square error ("MMSE") MIMO receiver and calculating an error vector magnitude ("EVM") of the transmitter, where the EVM for each transmission layer is calculated as 100 times the square root of the mean square error of the layer estimate at the output of the unbiased linear MMSE MIMO receiver.

Another method for calculating an EVM of a transmitter includes receiving a multiple-layer MIMO signal from a transmitter via a propagation channel and measuring the received multiple-layer MIMO signal using an unbiased linear MMSE MIMO equalizer. The second method includes calculating an EVM of the transmitter, where the EVM for each transmission layer is calculated as 100 times the square root of the mean square error of the layer estimate at the output of the unbiased linear MMSE MIMO equalizer.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
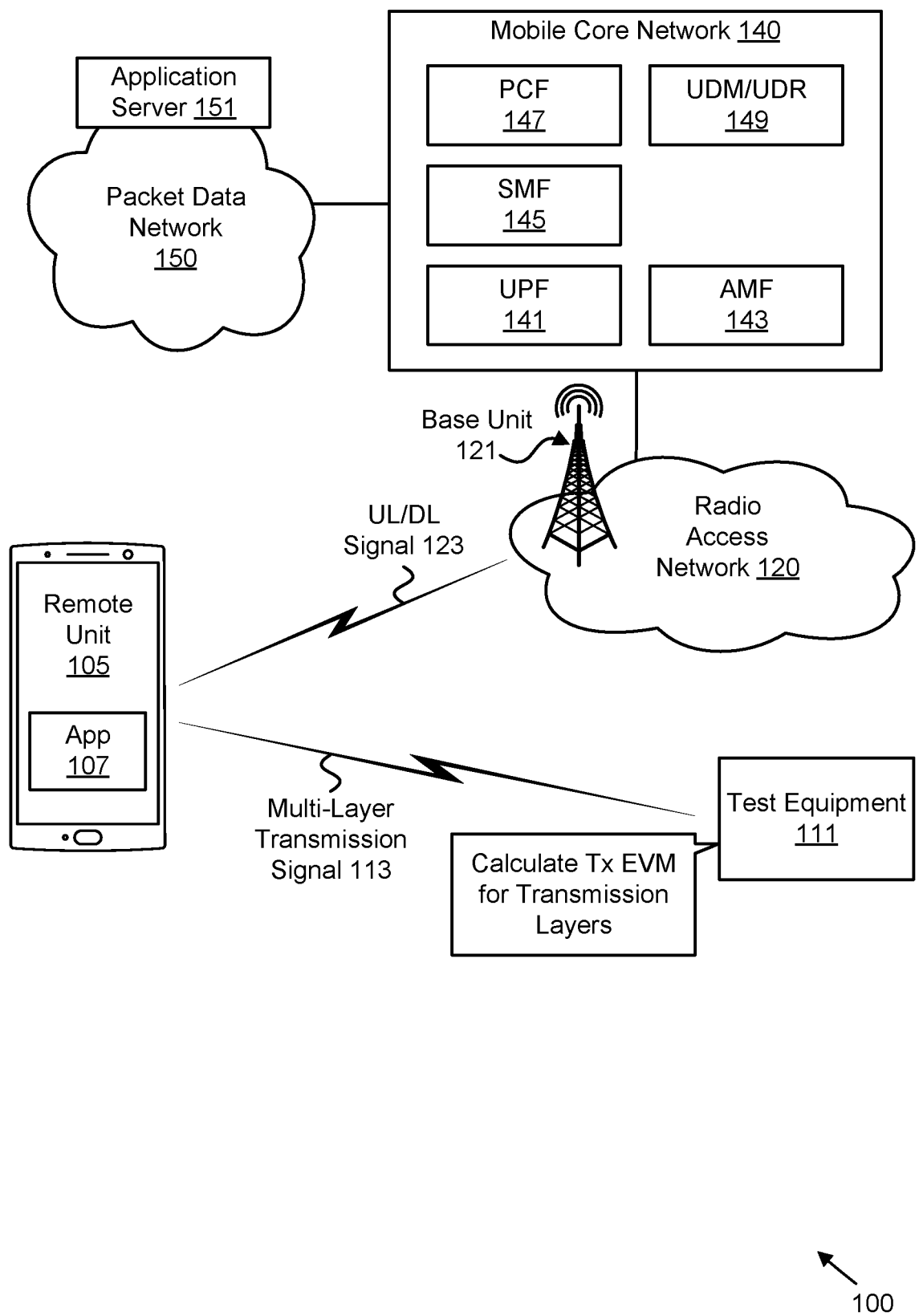
FIG. 1 is a schematic block diagram illustrating one embodiment of a wireless communication system for calculating an EVM of a transmitter.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for mechanisms for calculating an error vector magnitude ("EVM") of a transmitter. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The problem solved is the defining the UE transmit EVM for a multi-layer MIMO transmission. Due to leakage between the antennas within the UE, it seems that it is not possible to measure the EVM for the antenna connectors independently even in the case that the antenna precoder is the identity matrix. If the EVM is measured without addressing the leakage between the two antennas, the EVM requirement cannot be met.

In some embodiments, a linear zero-forcing MIMO equalizer (also referred to herein as linear zero-forcing MIMO receiver) is used to determine the transmitter EVM for a multi-layer transmission. However, the EVM determined by the linear zero-forcing MIMO equalizer is larger than that determined by the linear MIMO MMSE equalizer for the same signal. Yet, the linear MIMO MMSE equalizer (also referred to herein as linear MIMO MMSE receiver) is biased, and so the resulting EVM measurement is incorrect.

There is currently no agreement in 3GPP on how requirements on how transmit EVM should be specified for multi-layer MIMO. In some proposals, the EVM may be specified for each MIMO layer. In other proposals, the EVM may be specified for each antenna connector.

The purpose of the EVM requirement on the transmitter is to limit the noise floor at the receiver that is due to transmitter noise. Presumably, for multi-layer MIMO transmissions, the objective of the EVM requirement is to limit the noise/error floor due to transmitter noise for each MIMO layer. Thus, the relationship between the per antenna connector EVM at the UE antenna connectors and the per-layer EVM at the gNB should be investigated.

The present disclosure describes using a linear unbiased MMSE MIMO equalizer (also referred to herein as a linear unbiased MMSE MIMO receiver, an unbiased linear MMSE MIMO equalizer, or an unbiased linear MMSE MIMO receiver) which reduces the EVM relative to the zero-forcing MIMO equalizer. The present disclosure also shows that the resulting EVM is achievable by the UE independent of the propagation channel between the UE and the gNB (i.e., 5G base station).

Described herein is the relationship between the EVM at the transmitter antenna connectors and the per-layer EVM at the receiver in the case that the number of transmit and receive antennas are the same. Based on this analysis, solutions are described on how the EVM can be defined and specified at the UE for multi-layer transmission. While the below examples and descriptions may use a UE transmitter when describing the transmitting device, in other examples the transmitting device may be a gNB or other base station; thus, the transmitter EVM determined according to the below descriptions may be a UE transmitter EVM, a gNB transmitter EVM, or transmitter EVM of another transmitter.

In various embodiments, a transmitting device generates a multiple-layer transmission signal for MIMO and transmits the generated multiple-layer transmission signal (to an evaluation device) via a propagation channel using a transmitter. The evaluation device measures the transmitted multiple-layer transmission signal using a linear unbiased MMSE MIMO equalizer and calculates an EVM of the transmitter, where the EVM for each transmission layer is calculated as 100 times the square root of the mean square error of the layer estimate at the output of the linear unbiased MMSE MIMO equalizer.

FIG. 1 depicts a wireless communication system 100 for calculating an EVM of a transmitter, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, abase station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for calculating an EVM of a transmitter apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems calculating an EVM of a transmitter (e.g., UE transmitter or gNB transmitter).

EVM is a measure of modulation accuracy, or how well the power amplifier in the remote unit 105 is transmitting information, represented by the varying phase and amplitude of an RF signal. As such, the remote unit 105 may send a transmission signal 113 (e.g., a multi-layer transmission) to a test equipment 111. Upon receiving the transmission signal 113, the test equipment 111 calculates a transmitter EVM for multi-layer transmission. Note that in other embodiments, the remote unit 105 may transmit to the base unit 121, where the base unit 121 calculates a transmitter EVM for multi-layer transmission.

As mentioned above, the linear zero-forcing MIMO equalizer and the linear MMSE MIMO equalizer are considered for defining EVM for multi-layer transmission. The present disclosure evaluates these equalizers for defining EVM, and in addition, evaluates the unbiased linear MMSE MIMO receiver (also referred to herein as an unbiased linear MMSE MIMO equalizer).

In evaluating these receivers, several aspects are considered including whether the EVM defined using this method can similarly be achieved at the gNB receiver, regardless of the propagation channel between the UE and the gNB. If not achievable, then using such a method for defining the transmitter EVM might be of questionable value since the transmitter EVM could not be mapped to a corresponding noise floor at the receiver. However, in this contribution, it is shown that for each of the proposed receivers, the EVM is independent of the propagation channel between the UE and the gNB.

For these receivers, it is important that the mean of the data symbol estimate is unbiased, since the estimate should be unbiased in order to properly measure the error that is used to compute the EVM. In this contribution, it is shown that the linear zero-forcing MIMO receiver and the linear unbiased MMSE MIMO receiver, the data symbol estimate is unbiased. However, it is also shown that the data symbol estimate for the MMSE estimator is biased, so that the mean of the estimate is not equal to the true value, and a result, the error measurement used to compute the EVM has a non-zero mean.

Finally, the present disclosure provides expressions for the EVM for both the linear zero-forcing MIMO receiver and the linear unbiased MMSE MIMO receiver and show that in the general case, the EVM will be dependent on both the precoding matrix and the layer. Furthermore, this is true even in the case that the precoding matrix is equal to the identity matrix.

Figure 2:
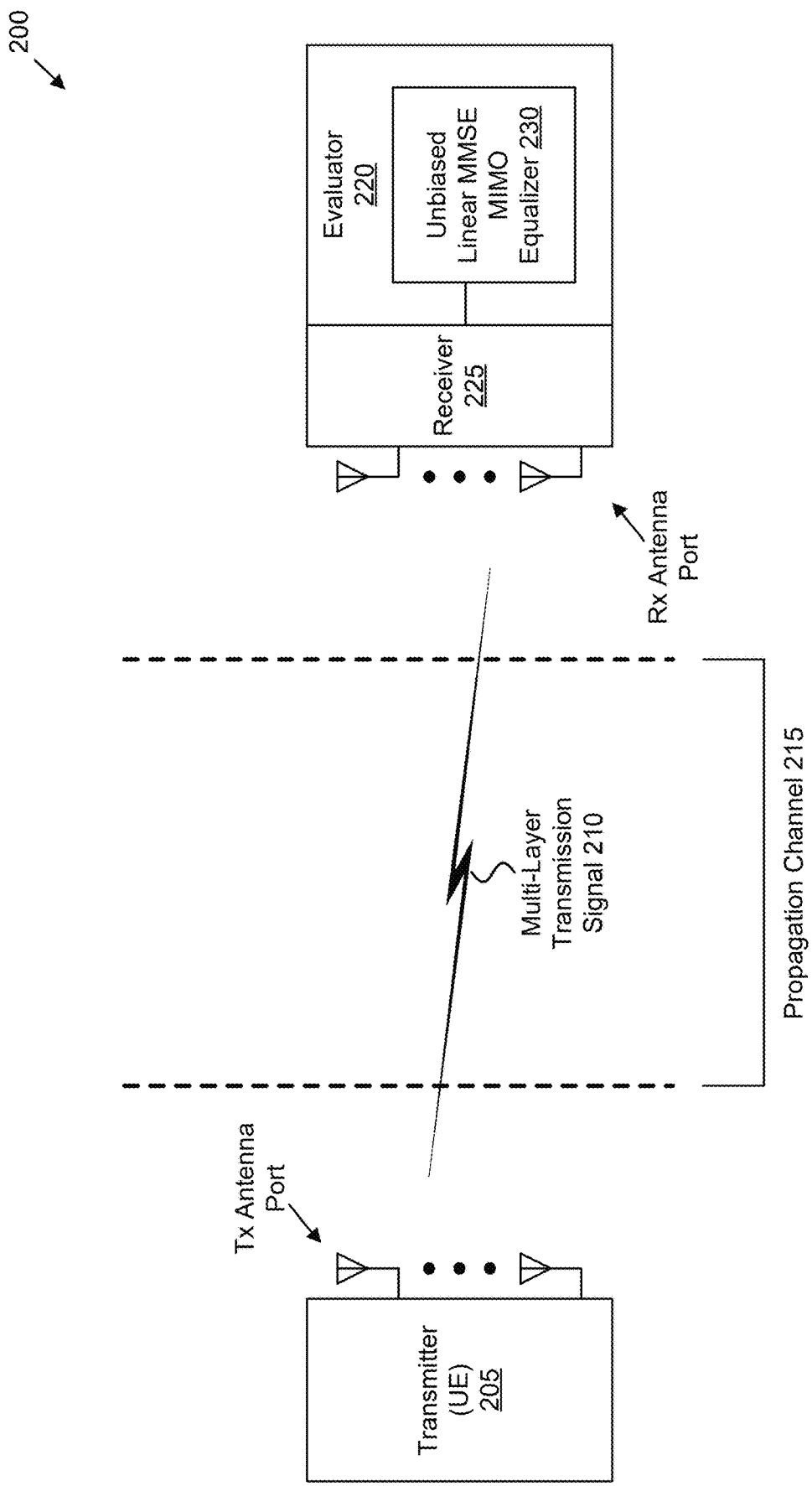
FIG. 2 is a block diagram illustrating one embodiment of a communication arrangement for calculating an EVM of a transmitter.

FIG. 2 is a block diagram illustrating one embodiment of a communication arrangement 200 for calculating an EVM of a transmitter. The arrangement 200 involves a transmitter 205 and an evaluator 220 for calculating an EVM of the transmitter 205. As depicted, the transmitter comprises a plurality of antennas. In some embodiments, the plurality of transmitter antennas ("Tx antennas") are arranged into one or more antenna ports (i.e., Tx antenna ports), each antenna port comprising multiple antennas and with an antenna connector for each antenna. In certain embodiments, the transmitter 205 is one embodiment of the remote unit 105 and the evaluator 220 is an embodiment of the test equipment 111 or the base unit 121. However, in other embodiments the transmitter may be an embodiment of the base unit 121, wherein the evaluator 220 is an embodiment of the test equipment 111 or another base unit 121.

The transmitter 205 generates a multiple-layer transmission signal for MIMO and transmits the multiple-layer transmission signal 210 to the evaluator 220 via a propagation channel 215. The evaluator 220 measures the multiple-layer transmission signal 210 using an unbiased linear MMSE MIMO equalizer 230 and calculates an EVM of the transmitter 205, according to the below descriptions. Note that the receiver 225 of the evaluator 220 may comprise a plurality of antennas. In some embodiments, the plurality of receiver antennas ("Rx antennas") are arranged into one or more antenna ports (i.e., Rx antenna ports), each antenna port comprising multiple antennas and with an antenna connector for each antenna. Importantly, to improve EVM accuracy, the multi-layer transmission signal 210 may be received by the receiver 225 using the same number of antennas as used by the transmitter 205. For example, the Rx antenna port may comprise the same number of antennas as comprises the transmitter antenna port.

Figure 3:
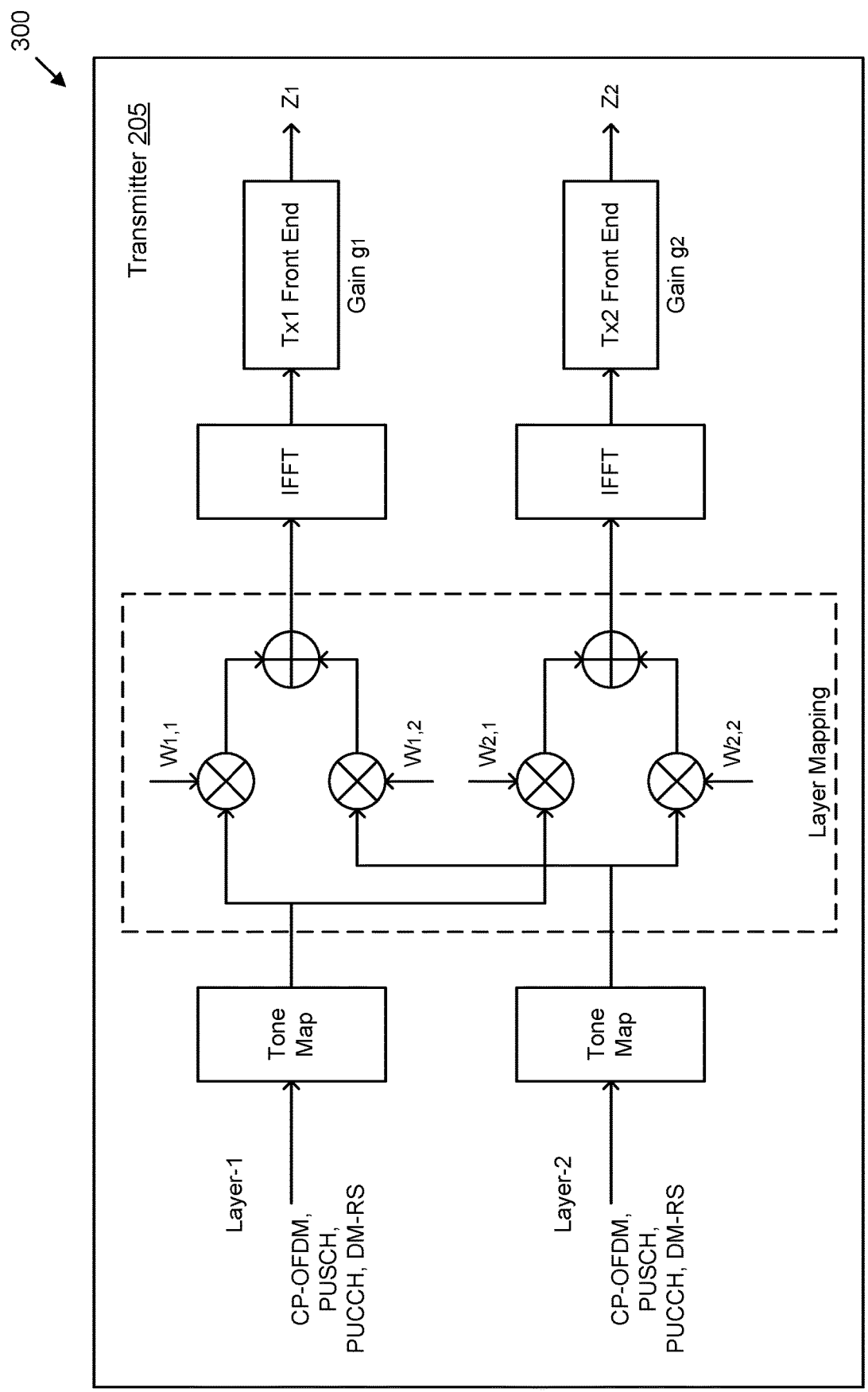
FIG. 3 is a block diagram illustrating one embodiment of a transmitter for two-layer MIMO transmission.

FIG. 3 depicts one example of a UE implementation 300 of a transmitter 205 for two-layer MIMO transmission. The transmitted signal is given by $$z=GWx+n,$$

where W is the rank-2 precoder, the data vector x is comprised of two data symbols so that $x^T=[x_1\ x_2]$. The vector $n^T=[n_1\ n_2]$ is the transmitter noise at the two antenna connectors which has covariance given by $\Sigma=E(n^H n)$. The matrix G is given by $$G = \begin{bmatrix} g_{1,1} & g_{1,2} \\ g_{2,1} & g_{2,2} \end{bmatrix},$$

where $g_{1,1}$ and $g_{2,2}$ denote the complex gains of the first and second transmitters and $g_{1,2}$ and $g_{2,1}$ denotes any signal leakage between the first and second signal paths.

Figure 4:
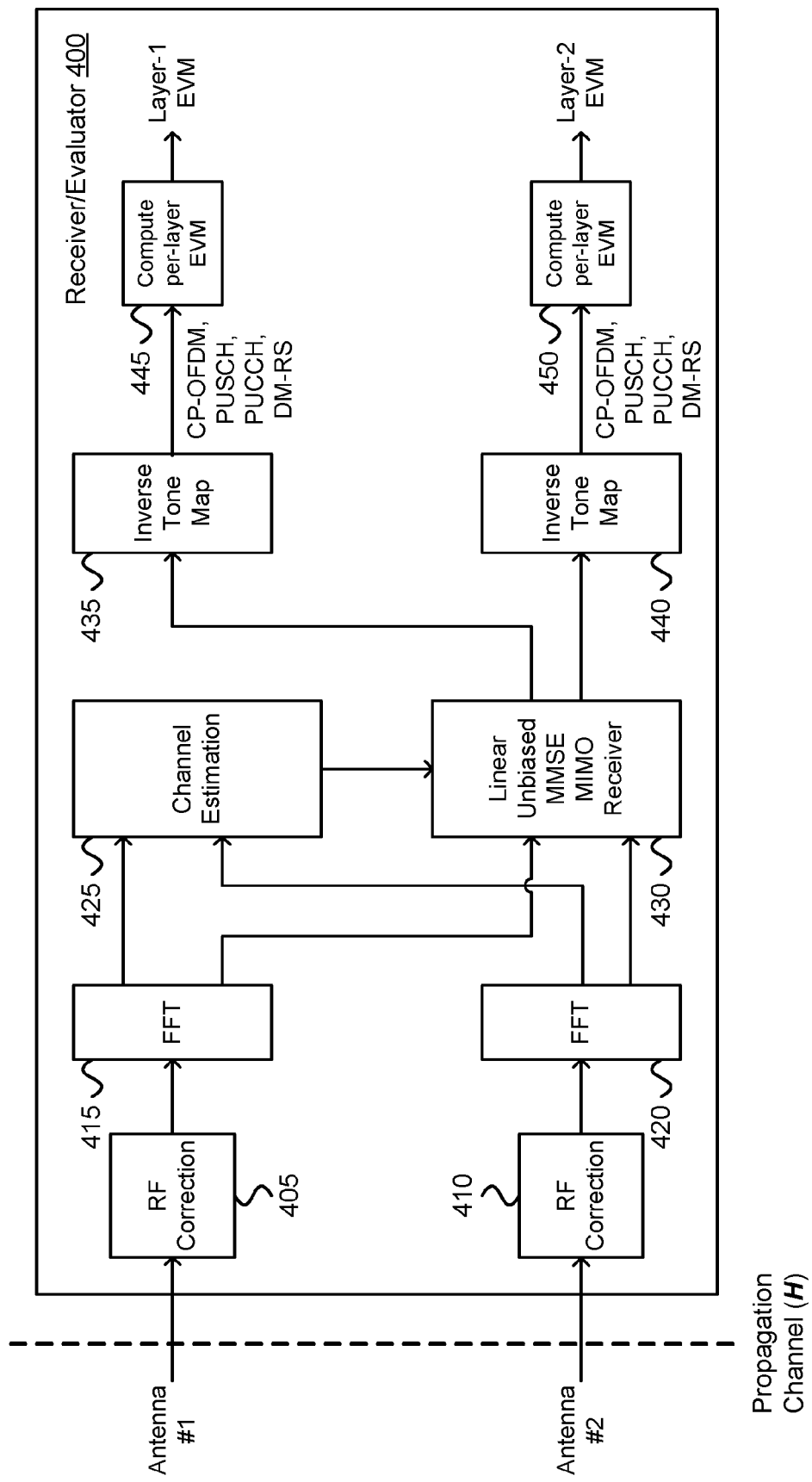
FIG. 4 is a block diagram illustrating one embodiment of a MIMO receiver used for EVM measurement.

FIG. 4 depicts a high-level block diagram of the MIMO receiver and evaluator ("receiver/evaluator") 400 used for EVM measurement. The receiver/evaluator 400 may be implemented by a base unit 121, such as a gNB or another RAN node, or it may be implemented by test equipment 111.

The receiver/evaluator 400 is coupled to two antennas (antenna #1 and antenna #2) with an antenna connector for each antenna. Here, the receiver/evaluator 400 receives a two-layer MIMO signal, such as that generated and transmitted by the transmitter 205.

In the depicted embodiment, the receiver/evaluator 400 includes separate RF correction blocks for each antenna, e.g., a first RF correction block 405 for a first antenna connector and a second RF correction block 410 for a second antenna connector. In other embodiments, the receiver/evaluator 400 may use a common RF correction block for both antenna connectors since the signals combine in the channel before they are received by the receiver/evaluator 400.

The Fast Fourier Transform ("FFT") block 415 receives the output of the RF correction block 405, while the FFT block 420 receives the output of the RF correction block 410. Both FFT blocks send their output to the channel estimation block 425. The linear unbiased MMSE MIMO receiver 430 receives input from the FFT block 415, the FFT block 420 and the Channel Estimation block 425. The linear unbiased MMSE MIMO receiver 430 estimates the data symbols of the MIMO transmission as described below.

For each transmission layer, the linear unbiased MMSE MIMO receiver 430 sends a layer estimate to an inverse tone map. In the depicted embodiment, a first inverse tone map 435 is associated with the first transmission layer ("Layer-1") and a second inverse tone map 440 is associated with the second transmission layer ("Layer-2").

In the depicted embodiment, the receiver/evaluator 400 includes a first EVM block 445 that computes a per-layer EVM for the first transmission layer and also includes a second EVM block 450 that computes a per-layer EVM for the second transmission layer.

In order to demodulate a two-layer MIMO transmission, the receiver (i.e., receiver/evaluator 400) must have at least two receive antennas. Since the transmitter noise also passes through the propagation channel, the signal received by the receiver is given by $$y=H(GWx+n),$$

where H is the channel matrix given by $$H = \begin{bmatrix} h_{1,1} & h_{1,2} \\ h_{2,1} & h_{2,2} \end{bmatrix},$$

and hij denotes the complex gain to the i-th receive antenna from the j-th transmit antenna.

In the discussion above, three different receiver types were considered for defining the UE transmit EVM for multi-layer MIMO. The linear zero-forcing MIMO receiver and the linear unbiased zero-forcing MIMO receivers have been shown to be feasible for defining EVM because they have the following two properties.

These estimators are unbiased so that $E(\hat{x})=x$, and as a result, the error measurement used for the EVM calculation has zero mean and the mean-square error reflects the expected link performance.

The resulting EVM definition does not depend on the propagation channel H, and thus the EVM can be achieved by the receiver regardless of the channel between the transmitter (i.e., UE) and the receiver (i.e., gNB).

Conversely, the MMSE estimator yields a biased estimate of the data symbol so that $E(\hat{x}) \neq x$. As a result, the error measurement use for the EVM calculation has non-zero mean and thus the mean-square error cannot be mapped directly to link performance. Furthermore, the signal power is overestimated as typically the mean of the MMSE estimator is less than the true mean. For this reason, the linear MMSE MIMO receiver is not a feasible solution for defining EVM for multi-layer MIMO transmission.

As a first solution for defining transmitter EVM for multiple-layer MIMO, a linear zero-forcing MIMO equalizer may be used to define and measure the transmit EVM for multi-layer MIMO transmission.

As a second solution for defining transmitter EVM for multiple-layer MIMO, an unbiased linear MMSE MIMO equalizer to define and measure the transmit EVM for the multi-layer MIMO transmission.

Regarding a zero-forcing MIMO receiver, from the model given above, the signal observed by the receiver (i.e., gNB and/or test equipment) is given by $$y=H(GWx+n)$$

Note that the receiver can measure the channel H G W directly if per-layer reference symbols are transmitted. If per-antenna reference symbols are used, then the receiver measures the channel H G and estimates H G W by multiplying by the precoding matrix W. Let $A_{ZF}$ be defined as $$A_{ZF}=(HGW)^{-1}$$

Then the zero-forcing receiver is given by $$\hat{x}_{ZF} = A_{ZF} y = (HGW)^{-1} y = x + v_{ZF}$$

where $$v_{ZF} = W^{-1} G^{-1} n$$

The zero-forcing receiver is unbiased since $$E(\hat{x}_{ZF}|x)=x.$$

The noise covariance is given by $$E(v_{ZF} v_{ZF}^H) = W^{-1} G^{-1} \sum G^{-H} W^{-H}$$
$$= W^H \sum{}' W$$

where $$\sum{}' = G^{-1} \sum G^{-H}$$

and $\Sigma'$ is dependent on the transmitter front-end impairment G but is independent of the channel H.

The vector EVM at the output of the linear zero-forcing MIMO receiver can be defined as $$EVM = 100 \left[ \frac{\left([W^H \sum{}' W]_{1,1}\right)^{1/2}}{\left([W^H \sum{}' W]_{2,2}\right)^{1/2}} \right].$$

If the precoder matrix is the identity matrix I, then $$EVM = 100 \cdot \left[ \frac{\left(\sum{}'_{1,1}\right)^{1/2}}{\left(\sum{}'_{2,2}\right)^{1/2}} \right].$$

From the above, the following observations are made with respect to the linear zero-forcing MIMO receiver. Here, it is observed that the linear zero-forcing MIMO estimator is unbiased so that $$E(\hat{x}_{1,ZF}|x_1)=x_1,$$

$$E(\hat{x}_{2,ZF}|x_2)=x_2.$$

As a result, the error measurement use for the EVM calculation has zero mean and thus the mean-square error reflects the expected link performance.

It is also observed that because the EVM definition does not depend on the propagation channel H, the EVM can be achieved by the receiver regardless of the channel between the transmitter (i.e., UE) and the receiver (i.e., gNB) so long as the channel H is invertible.

This property is important because by connecting directly to the antenna connectors, the channel used by the test equipment to evaluate the EVM is the identity matrix, so that H=I. If the EVM definition were to be dependent on the propagation matrix H, then the definition and requirement may not be of practical benefit in setting the lower bound on the channel quality due to transmitter impairments.

It is further observed that unless the covariance matrix $W^H \Sigma' W$ is proportional to the identity matrix, the EVM will depend both on the precoding matrix and the layer. However, as noted above, the EVM determined by the linear zero-forcing MIMO equalizer is larger than that determined by the linear MIMO MMSE equalizer for the same signal.

Regarding the linear MMSE MIMO equalizer, the linear MMSE MIMO receiver is given by $$\hat{x}_{MMSE}=A_{MMSE}y$$

where it can be shown that $$A_{MMSE}=W^H G^H H^H (HGWW^H G^H H^H + H\Sigma H^H)^{-1}.$$

Expanding the above results in.

$$x_{MMSE}=W^H G^H H^H (HGWW^H G^H H^H + H\Sigma H^H)^{-1} HGWx + v_{MMSE}$$

where $$v_{MMSE}=W^H G^H H^H (HGWW^H G^H H^H + H\Sigma H^H)^{-1} Hn.$$

In order to compute $A_{MMSE}$, the receiver only needs to measure and estimate two quantities, and these are the composite channel H G W and the covariance of the received transmitter noise before equalization $H \Sigma H^H$. As discussed above, the receiver can estimate the channel H G W using per-layer reference symbols or per-antenna reference symbols in combination with knowledge of the precoder W. Using the same reference symbols, the noise H n can be estimated as $$\widehat{Hn}_{=y-} \widehat{H\,G\,W} x$$

and from this, $H \Sigma H^H$ can be estimated as $$\widehat{H\Sigma H^H}_{=E(}\widehat{Hn}_{(}\widehat{Hn}_{)^H)}.$$

Since both quantities H G W and $H \Sigma H^H$ can be estimated at the receiver, the linear MMSE MIMO receiver is implementable.

The expected value of $\hat{x}_{MMSE}$ given the vector data symbol x is given by $$E(\hat{x}_{MMSE}|x)=Qx$$

where $$Q=W^H G^H (GWW^H G^H + \Sigma)^{-1} GW,$$

and it is assumed that the channel matrix H is invertible. As a result, it is apparent that the estimate $\hat{x}_{MMSE}$ is biased unless Q is the identity matrix. If the expected values of the data symbols are instead considered, while treating the symbol on the other layer as noise, then the above vector becomes $$E(\hat{x}_{1,MMSE}|x_1)=Q_{1,1}x_1$$

$$E(\hat{x}_{2,MMSE}|x_2)=Q_{2,2}x_2$$

and the estimator is unbiased only if $Q_{1,1}=Q_{2,2}=1$. However, because the MMSE estimator is always biased, the measured error for the two layers will have non-zero means given by $1-Q_{1,1}$ and $1-Q_{2,2}$, respectively, and the error measurements used to compute the EVM will be incorrect.

With the assumption that the channel H is invertible, the error $v_{MMSE}$ can be simplified as $$v_{MMSE}=W^H G^H(GWW^H G^H+\Sigma)^{-1}n.$$

Let P denote the error covariance given by $$P=E(v_{MMSE}{}^H v_{MMSE})=W^H G^H(GG^H+\Sigma)^{-1}\Sigma(GG^H+\Sigma)^{-1}GW$$

and note that the mean-square errors for the first and second layers are given by $$E(|\hat{x}_{1,MMSE}-x_1|^2)=|1-Q_{1,1}|^2+|Q_{1,2}|^2+P_{1,1}$$

$$E(|\hat{x}_{2,MMSE}-x_2|^2)=|1-Q_{2,2}|^2+|Q_{2,1}|^2+P_{2,2}$$

It is useful to note that because the matrices Q and P are independent of H, 20 the mean-square error is independent of the channel.

Finally, if the precoding matrix is the identity matrix, then, then the matrices Q and P can be further simplified as $$Q=G^H(GG^H+\Sigma)^{-1}G$$

and $$P=G^H(GG^H+\Sigma)^{-1}\Sigma(GG^H+\Sigma)^{-1}G.$$

From the above, with respect to the linear MMSE MIMO receiver, it is observed that the estimator is biased so that $$E(\hat{x}_{1,MMSE}|x_1)\neq x_1$$

$$E(\hat{x}_{2,MMSE,U}|x_2)\neq x_2.$$

As a result, the error measurement use for the EVM calculation has non-zero mean and thus the mean-square error cannot be mapped directly to link performance. Furthermore, the signal power is overestimated as typically the mean of the MMSE estimator is less than the true mean.

Based on this observation, the linear MMSE MIMO receiver is not suitable for measuring the transmitter EVM for multi-layer MIMO transmission.

Regarding the unbiased linear MMSE MIMO equalizer, the unbiased linear MMSE MIMO receiver can be obtained by scaling the MMSE receiver. Specifically, let $$\hat{x}_{MMSE,U}=A_{MMSE,U}y$$

where $$A_{MMSE,U} = \begin{bmatrix} Q_{1,1}^{-1} & 0 \\ 0 & Q_{2,2}^{-1} \end{bmatrix} Q.$$

and, as in the previous section, $$Q=W^H G^H(GG^H+\Sigma)^{-1}G^W.$$

For this receiver, $$\hat{x}_{MMSE,U} = \begin{bmatrix} Q_{1,1}^{-1} & 0 \\ 0 & Q_{2,2}^{-1} \end{bmatrix} Qx + v_{MMSE,U}$$

and $$v_{MMSE,U} = \begin{bmatrix} Q_{1,1}^{-1} & 0 \\ 0 & Q_{2,2}^{-1} \end{bmatrix} W^H G^H(GG^H+\Sigma)^{-1}n$$

The data symbol estimate is unbiased since $$E(\hat{x}_{1,MMSE,U}|x_1)=x_1$$

$$E(\hat{x}_{2,MMSE,U}|x_2)=x_2$$

and the variance of the noise is given by $$E(v_{MMSE,U}^H v_{MMSE,U}) = \begin{bmatrix} Q_{1,1}^{-1} & 0 \\ 0 & Q_{2,2}^{-1} \end{bmatrix} P \begin{bmatrix} Q_{1,1}^{-1} & 0 \\ 0 & Q_{2,2}^{-1} \end{bmatrix},$$

where, as in the previous section $$P=W^H G^H(GG^H+\Sigma)^{-1}\Sigma(GG^H+\Sigma)^{-1}GW$$

Finally, the mean-square error of the linear unbiased MMSE estimator is given by $$E(|\hat{x}_{1,MMSE,U}-x_1|^2) = \frac{1}{|Q_{1,1}|^2}(|Q_{1,2}|^2 + P_{1,1})$$

$$E(|\hat{x}_{2,MMSE,U}-x_2|^2) = \frac{1}{|Q_{2,2}|^2}(|Q_{2,1}|^2 + P_{2,2}),$$

and as a result, the EVM of the first and second layers is given by $$EVM_1 = 100 \cdot \sqrt{\frac{1}{|Q_{1,1}|^2}(|Q_{1,2}|^2 + P_{1,1})}$$

$$EVM_2 = 100 \cdot \sqrt{\frac{1}{|Q_{2,2}|^2}(|Q_{2,1}|^2 + P_{2,2})}$$

Because the matrices Q and P are independent of the channel matrix H, this EVM definition is independent of the propagation channel H and thus can be achieved regardless of the channel between the UE and the receiver so long as the channel H is invertible.

From the above, the following observations are made with respect to the linear unbiased MMSE MIMO receiver.

It is observed that the estimator is unbiased so that $$E(\hat{x}_{1,MMSE,U}|x_1)=x_1,$$

$$E(\hat{x}_{2,MMSE,U}|x_2)=x_2.$$

As a result, the error measurement used for the EVM calculation has zero mean and the mean-square error reflects the expected link performance.

It is also observed that because the EVM definition does not depend on the propagation channel H, the EVM can be achieved by the receiver regardless of the channel between the transmitter (i.e., UE) and the receiver (i.e., gNB) so long as the channel H is invertible.

It is further observed that unless the covariance matrix is proportional to the identity matrix, then the mean-square error of the linear unbiased MMSE estimator is $$E\left(v_{MMSE,U}^H v_{MMSE,U}\right) = \begin{bmatrix} Q_{1,1}^{-1} & 0 \\ 0 & Q_{2,2}^{-1} \end{bmatrix} P \begin{bmatrix} Q_{1,1}^{-1} & 0 \\ 0 & Q_{2,2}^{-1} \end{bmatrix}$$

and the EVM will depend both on the precoding matrix and the layer.

Based on the above observations, both the linear zero-forcing MIMO receiver and the linear unbiased MMSE MIMO receiver are feasible candidates for use in defining transmitter EVM for multi-layer MIMO transmission. The linear MMSE MIMO receiver should not be considered because the resulting data symbol estimates are always biased, and as a result, the error measurement that would be used for the EVM computation has non-zero mean and is incorrect.

Figure 5:
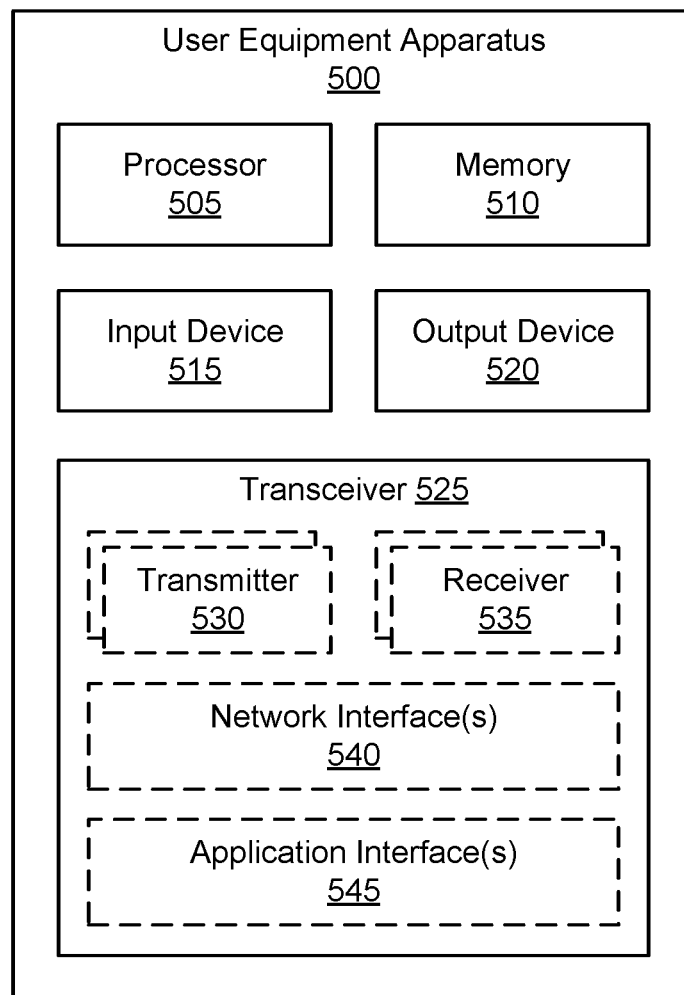
FIG. 5 is a block diagram illustrating one embodiment of a user equipment apparatus that may be used for determining transmitter EVM for a multi-layer transmission.

FIG. 5 depicts a user equipment apparatus 500 that may be used for calculating an EVM of a transmitter, according to embodiments of the disclosure. In various embodiments, the user equipment apparatus 500 is used to implement one or more of the solutions described above. The user equipment apparatus 500 may be one embodiment of the remote unit 105 and/or the transmitter 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 generates a multiple-layer MIMO transmission signal and controls the transceiver 525 to transmit the generated multiple-layer transmission signal to an evaluation device via a propagation channel. As described herein, the evaluation device measures the transmitted multiple-layer transmission signal using an unbiased linear MMSE MIMO equalizer and calculates an EVM of the transmitter, where the EVM for each transmission layer is calculated as 100 times the square root of the mean square error of the layer estimate at the output of the linear unbiased MMSE MIMO equalizer.

In some embodiments, the multiple-layer MIMO transmission comprises a two-layer MIMO transmission. In such embodiments, the mean square error for each transmission layer is a function of the covariance of the transmitter noise. In some embodiments, the generated multiple-layer MIMO transmission signal comprises per-layer reference symbols or per-antenna reference symbols.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to calculating an EVM of a transmitter. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
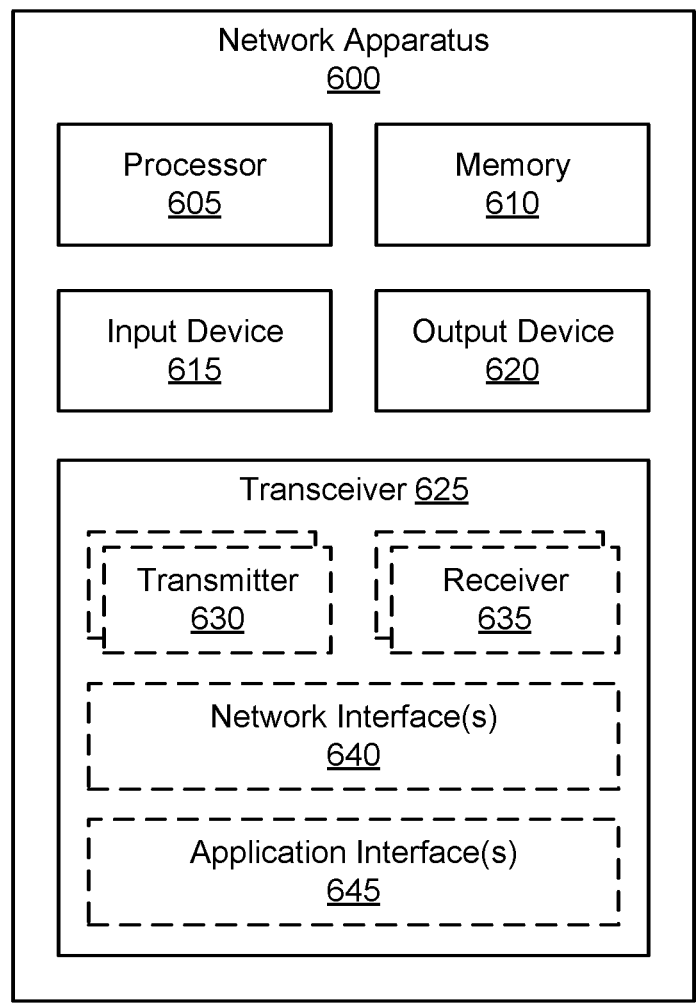
FIG. 6 is a block diagram illustrating one embodiment of a network apparatus that may be used for determining transmitter EVM for a multi-layer transmission.

FIG. 6 depicts a network apparatus 600 that may be used for calculating an EVM of a transmitter, according to embodiments of the disclosure. In one embodiment, network apparatus 600 may be one implementation of an evaluation device, such as the test equipment 111, the base unit 121, the evaluator 220, and/or the receiver/evaluator 400, as described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the processor 605 generates a multiple-layer MIMO transmission signal and controls the transmitter 630 to transmit the generated multiple-layer transmission signal to an evaluation device via a propagation channel. As described herein, the evaluation device measures the transmitted multiple-layer transmission signal using an unbiased linear MMSE MIMO equalizer and calculates an EVM of the transmitter 630, where the EVM for each transmission layer is calculated as 100 times the square root of the mean square error of the layer estimate at the output of the linear unbiased MMSE MIMO equalizer.

In some embodiments, the multiple-layer MIMO transmission comprises a two-layer MIMO transmission. In such embodiments, the mean square error for each transmission layer is a function of the covariance of the transmitter noise. In some embodiments, the generated multiple-layer MIMO transmission signal comprises per-layer reference symbols or per-antenna reference symbols.

In various embodiments, the receiver 635 receives a multiple-layer MIMO signal from a transmitter (e.g., UE transmitter or gNB transmitter) via a propagation channel. The processor 605 measures the received multiple-layer MIMO signal using an unbiased linear MMSE MIMO equalizer and calculates an EVM of the transmitter, where the EVM for each transmission layer is calculated as 100 times the square root of the mean square error of the layer estimate at the output of the linear unbiased MMSE MIMO equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the multiple-layer transmission signal. Note that the matrix H is invertible if it has full rank, or equivalently if its determinant is not zero, or equivalently if $H^{-1}$ can be defined such that $H*H^{-1}=I$ (the identity matrix).

In some embodiments, the multiple-layer transmission comprises a two-layer MIMO transmission, where the mean square error for each transmission layer is a function of the covariance of the transmitter noise. In some embodiments, the EVM of a first transmission layer is calculated as $$EVM_1 = 100 \cdot \sqrt{\frac{1}{|Q_{1,1}|^2}(|Q_{1,2}|^2 + P_{1,1})},$$

and the EVM of a second transmission layer is calculated as $$EVM_2 = 100 \cdot \sqrt{\frac{1}{|Q_{2,2}|^2}(|Q_{2,1}|^2 + P_{2,2})},$$

where the values $Q_{1,1}$, $Q_{1,2}$, $Q_{2,1}$, $Q_{2,2}$, form a matrix Q which denotes the linear MMSE MIMO equalizer, and where the values $P_{1,1}$, $P_{2,2}$, are values from a matrix P which denotes the noise covariance matrix for the linear MMSE MIMO equalizer.

In some embodiments, the mean error of the unbiased linear MMSE MIMO is zero. In some embodiments, the generated multiple-layer transmission signal comprises per-layer reference symbols or per-antenna reference symbols.

In some embodiments, the transmitter is a UE transmitter for transmitting uplink MIMO signals to a base station. In such embodiments, the processor 605 may further define a noise floor of the base station due to transmitter noise using the calculated EVM.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to calculating an EVM of a transmitter. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
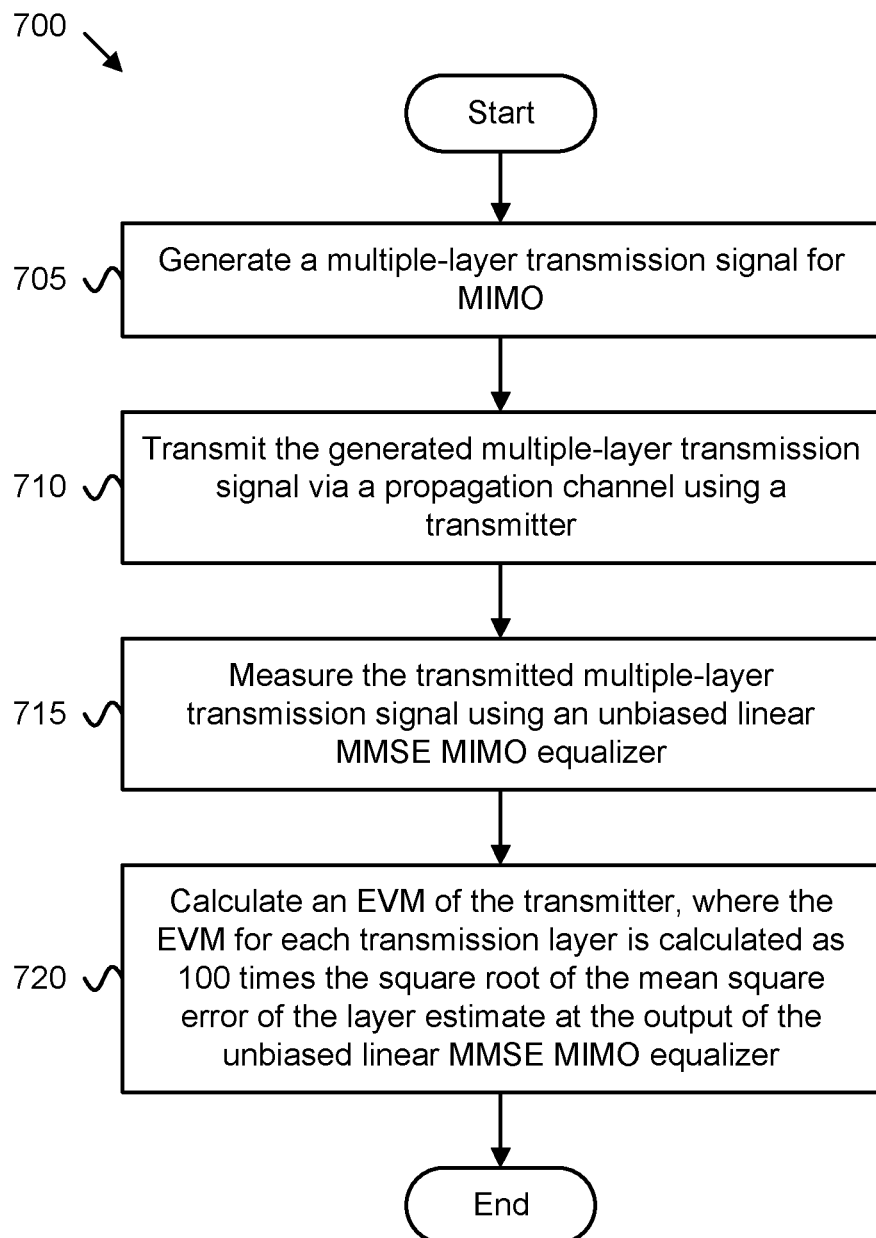
FIG. 7 is a block diagram illustrating one embodiment of a first method for determining transmitter EVM for a multi-layer transmission.

FIG. 7 depicts one embodiment of a method 700 for calculating an EVM of a transmitter, according to embodiments of the disclosure. In various embodiments, the method 700 is performed by a transmitting device (such as the remote unit 105, the transmitter 205, and/or the user equipment apparatus 500) and an evaluation device (such as the test equipment 111, the base unit 121, the receiver/evaluator 400, and/or the network apparatus 600), as described above. In some embodiments, the method 700 is performed by a processor, such as a microcontroller, a microprocessor, a CPU, a GPU, an auxiliary processing unit, a FPGA, or the like.

The method 700 begins and generates 705 (i.e., by the transmitting device) a multiple-layer transmission signal for MIMO. The method 700 includes transmitting 710 the generated multiple-layer transmission signal via a propagation channel using a transmitter. The method 700 includes measuring 715 (i.e., by the evaluation device) the transmitted multiple-layer transmission signal using an unbiased linear MMSE MIMO equalizer. The method 700 includes calculating 720 an error vector magnitude ("EVM") of the transmitter. Here, the EVM for each transmission layer is calculated as 100 times the square root of the mean square error of the layer estimate at the output of the unbiased linear MMSE MIMO equalizer. The method 700 ends.

Figure 8:
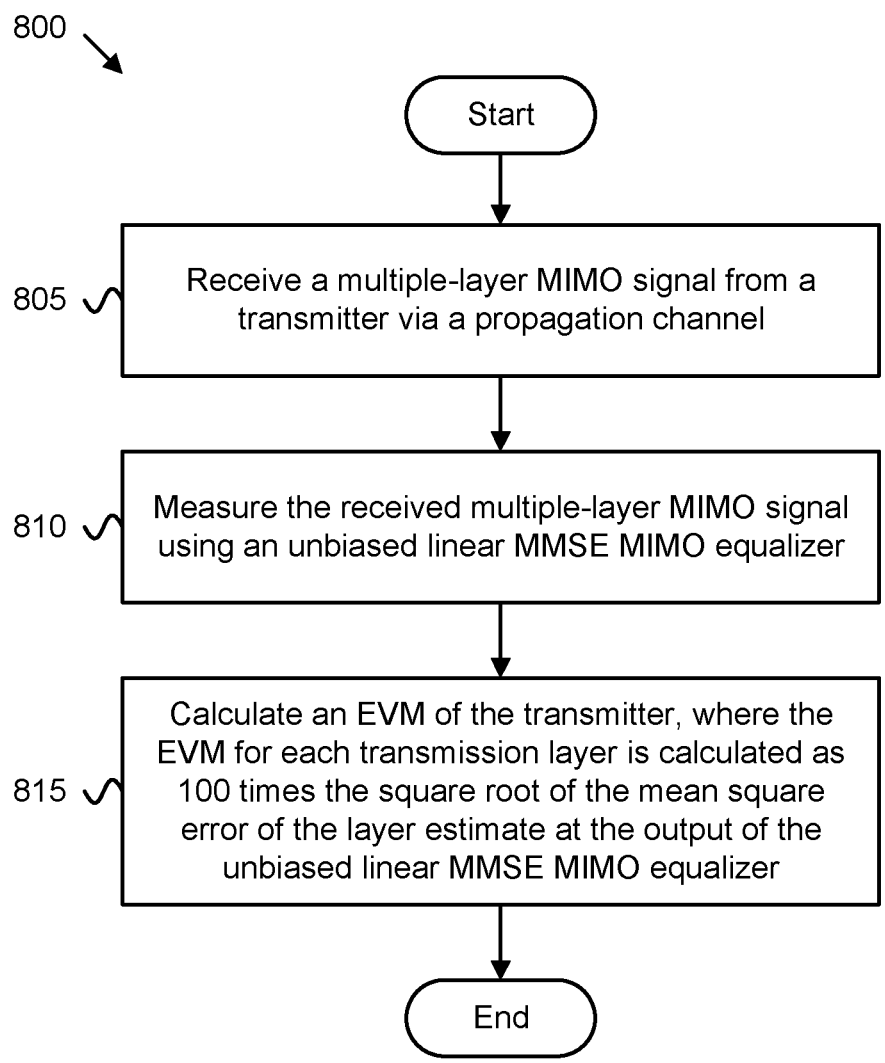
FIG. 8 is a block diagram illustrating one embodiment of a second method for determining transmitter EVM for a multi-layer transmission.

FIG. 8 depicts one embodiment of a method 800 for calculating an EVM of a transmitter, according to embodiments of the disclosure. In various embodiments, the method 800 is performed by an evaluation device, such as the test equipment 111, the base unit 121, the receiver/evaluator 400, and/or the network apparatus 600, as described above. In some embodiments, the method 800 is performed by a processor, such as a microcontroller, a microprocessor, a CPU, a GPU, an auxiliary processing unit, a FPGA, or the like.

The method 800 begins and receives 805 a multiple-layer MIMO signal from a transmitter via a propagation channel. The method 800 includes measuring 810 the received multiple-layer MIMO signal using an unbiased linear MMSE MIMO equalizer. The method 800 includes calculating 815 an EVM of the transmitter, where the EVM for each transmission layer is calculated as 100 times the square root of the mean square error of the layer estimate at the output of the linear unbiased MMSE MIMO equalizer. The method 800 ends.

Disclosed herein is a first system for calculating an EVM of a transmitter, according to embodiments of the disclosure. The first system may be implemented by a transmitting device (such as the remote unit 105, the transmitter 205, and/or the user equipment apparatus 500) and an evaluating device (such as the test equipment 111, the base unit 121, the receiver/evaluator 400, and/or the network apparatus 600), described above. The transmitting device generates a multiple-layer transmission signal for MIMO and transmits the generated multiple-layer transmission signal (to the evaluation device) via a propagation channel using a transmitter. The evaluation device measures the transmitted multiple-layer transmission signal using an unbiased linear MMSE MIMO equalizer and calculates an EVM of the transmitter, where the EVM for each transmission layer is calculated as 100 times the square root of the mean square error of the layer estimate at the output of the linear unbiased MMSE MIMO equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the multiple-layer transmission signal.

In some embodiments, the multiple-layer transmission comprises a two-layer MIMO transmission, where the mean square error for each transmission layer is a function of the covariance of the transmitter noise. In some embodiments, the EVM of a first transmission layer is calculated as $$EVM_1 = 100 \cdot \sqrt{\frac{1}{|Q_{1,1}|^2}(|Q_{1,2}|^2 + P_{1,1})},$$

and the EVM of a second transmission layer is calculated as $$EVM_2 = 100 \cdot \sqrt{\frac{1}{|Q_{2,2}|^2}(|Q_{2,1}|^2 + P_{2,2})},$$

where the values $Q_{1,1}$, $Q_{1,2}$, $Q_{2,1}$, $Q_{2,2}$, form a matrix Q which denotes the linear MMSE MIMO equalizer, and where the values $P_{1,1}$, $P_{2,2}$, are values from a matrix P which denotes the noise covariance matrix for the linear MMSE MIMO equalizer.

In some embodiments, the mean error of the unbiased linear MMSE MIMO is zero. In some embodiments, the generated multiple-layer transmission signal comprises per-layer reference symbols or per-antenna reference symbols.

In some embodiments, the transmitter comprises a User Equipment transmitter for transmitting uplink MIMO signals to a base station. In some embodiments, the evaluation device may further define a noise floor of the base station due to transmitter noise using the calculated EVM.

Disclosed herein is a first method for calculating an EVM of a transmitter, according to embodiments of the disclosure. The first method may be performed by a system comprising a UE transmitter (for example, a remote unit 105, a transmitter 205, and/or the user equipment apparatus 500) and a receiver (for example, a base unit 121, a test equipment 109, a receiver/evaluator 400, and/or network apparatus 600), described above.

The first method includes generating a multiple-layer transmission signal for MIMO and transmitting the generated multiple-layer transmission signal via a propagation channel using a transmitter. The first method includes measuring the transmitted multiple-layer transmission signal using an unbiased linear MMSE MIMO equalizer and calculating an error vector magnitude ("EVM") of the transmitter. Here, the EVM for each transmission layer is calculated as 100 times the square root of the mean square error of the layer estimate at the output of the unbiased linear MMSE MIMO equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the multiple-layer transmission signal.

In some embodiments, the multiple-layer transmission comprises a two-layer MIMO transmission, where the mean square error for each transmission layer is a function of the covariance of the transmitter noise. In some embodiments, the EVM of a first transmission layer is calculated as $$EVM_1 = 100 \cdot \sqrt{\frac{1}{|Q_{1,1}|^2}(|Q_{1,2}|^2 + P_{1,1})},$$

and the EVM of a second transmission layer is calculated as $$EVM_2 = 100 \cdot \sqrt{\frac{1}{|Q_{2,2}|^2}(|Q_{2,1}|^2 + P_{2,2})},$$

where the values $Q_{1,1}$, $Q_{1,2}$, $Q_{2,1}$, $Q_{2,2}$, form a matrix Q which denotes the linear MMSE MIMO equalizer, and where the values $P_{1,1}$, $P_{2,2}$, are values from a matrix P which denotes the noise covariance matrix for the linear MMSE MIMO equalizer.

In some embodiments, the mean error of the unbiased linear MMSE MIMO equalizer is zero. In some embodiments, the generated multiple-layer transmission signal includes per-layer reference symbols or per-antenna reference symbols.

In some embodiments, the transmitter includes a User Equipment transmitter for transmitting uplink MIMO signals to a base station. In such embodiments, the first method may further include defining a noise floor of the base station due to transmitter noise using the calculated EVM.

Disclosed herein is a first apparatus for calculating an EVM of a transmitter, according to embodiments of the disclosure. The first apparatus may be implemented by a transmitting device in a mobile communication network, such as the remote unit 105, the transmitter 205, and/or the user equipment apparatus 500, described above. The first apparatus includes a transceiver and a processor that generates a multiple-layer MIMO transmission signal and controls the transceiver to transmit the generated multiple-layer transmission signal to an evaluation device via a propagation channel. Here, the evaluation device measures the transmitted multiple-layer transmission signal using an unbiased linear MMSE MIMO equalizer and calculates an EVM of the transmitter, where the EVM for each transmission layer is calculated as 100 times the square root of the mean square error of the layer estimate at the output of the linear unbiased MMSE MIMO equalizer.

In some embodiments, the multiple-layer MIMO transmission comprises a two-layer MIMO transmission. In such embodiments, the mean square error for each transmission layer is a function of the covariance of the transmitter noise. In some embodiments, the generated multiple-layer MIMO transmission signal comprises per-layer reference symbols or per-antenna reference symbols.

Disclosed herein is a second apparatus for calculating an EVM of a transmitter, according to embodiments of the disclosure. The second apparatus may be implemented by an evaluation device, such as the test equipment 111, the base unit 121, the receiver/evaluator 400, and/or the network apparatus 600, described above.

The second apparatus includes a receiver that receives a multiple-layer MIMO signal from a transmitter via a propagation channel and a processor that measures the received multiple-layer MIMO signal using an unbiased linear MMSE MIMO equalizer. The processor calculates an EVM of the transmitter, where the EVM for each transmission layer is calculated as 100 times the square root of the mean square error of the layer estimate at the output of the linear unbiased MMSE MIMO equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the multiple-layer transmission signal.

In some embodiments, the multiple-layer transmission comprises a two-layer MIMO transmission, where the mean square error for each transmission layer is a function of the covariance of the transmitter noise. In some embodiments, the EVM of a first transmission layer is calculated as $$EVM_1 = 100 \cdot \sqrt{\frac{1}{|Q_{1,1}|^2}(|Q_{1,2}|^2 + P_{1,1})},$$

and the EVM of a second transmission layer is calculated as $$EVM_2 = 100 \cdot \sqrt{\frac{1}{|Q_{2,2}|^2}(|Q_{2,1}|^2 + P_{2,2})},$$

where the values $Q_{1,1}$, $Q_{1,2}$, $Q_{2,1}$, $Q_{2,2}$, form a matrix Q which denotes the linear MMSE MIMO equalizer, and where the values $P_{1,1}$, $P_{2,2}$, are values from a matrix P which denotes the noise covariance matrix for the linear MMSE MIMO equalizer.

In some embodiments, the mean error of the unbiased linear MMSE MIMO is zero. In some embodiments, the generated multiple-layer transmission signal comprises per-layer reference symbols or per-antenna reference symbols.

In some embodiments, the transmitter is a User Equipment transmitter for transmitting uplink MIMO signals to a base station. In such embodiments, the processor may further define a noise floor of the base station due to transmitter noise using the calculated EVM.

Disclosed herein is a second method for calculating an EVM of a transmitter, according to embodiments of the disclosure. The second method may be performed by an evaluation device, such as the test equipment 111, the base unit 121, the receiver/evaluator 400, and/or the network apparatus 600, described above. The second method includes receiving a multiple-layer MIMO signal from a transmitter via a propagation channel and measuring the received multiple-layer MIMO signal using an unbiased linear MMSE MIMO equalizer. The second method includes calculating an EVM of the transmitter, where the EVM for each transmission layer is calculated as 100 times the square root of the mean square error of the layer estimate at the output of the linear unbiased MMSE MIMO equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the multiple-layer transmission signal.

In some embodiments, the multiple-layer transmission comprises a two-layer MIMO transmission, where the mean square error for each transmission layer is a function of the covariance of the transmitter noise. In some embodiments, the EVM of a first transmission layer is calculated as $$EVM_1 = 100 \cdot \sqrt{\frac{1}{|Q_{1,1}|^2}(|Q_{1,2}|^2 + P_{1,1})},$$

and the EVM of a second transmission layer is calculated as $$EVM_2 = 100 \cdot \sqrt{\frac{1}{|Q_{2,2}|^2}(|Q_{2,1}|^2 + P_{2,2})},$$

where the values $Q_{1,1}$, $Q_{1,2}$, $Q_{2,1}$, $Q_{2,2}$, form a matrix Q which denotes the linear MMSE MIMO equalizer, and where the values $P_{1,1}$, $P_{2,2}$, are values from a matrix P which denotes the noise covariance matrix for the linear MMSE MIMO equalizer.

In some embodiments, the mean error of the unbiased linear MMSE MIMO is zero. In some embodiments, the generated multiple-layer transmission signal comprises per-layer reference symbols or per-antenna reference symbols.

In some embodiments, the transmitter is a User Equipment transmitter for transmitting uplink MIMO signals to a base station. In such embodiments, the second method may include defining a noise floor of the base station due to transmitter noise using the calculated EVM.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An evaluation apparatus comprising:
at least one memory; and
at least one processor coupled with the at least one memory and configured to cause the evaluation apparatus to:
receive a multiple-layer Multiple-Input, Multiple-Output ("MIMO") signal from a transmitter via a propagation channel;
measure the multiple-layer MIMO signal using an unbiased linear minimum mean square error ("MMSE") MIMO equalizer; and
calculate an error vector magnitude ("EVM") of the transmitter based on a noise covariance matrix for the unbiased linear MMSE MIMO equalizer and further based on a plurality of per-layer EVM values corresponding to the multiple-layer MIMO signal, wherein the per-layer EVM value for each transmission layer is calculated as 100 times a square root of a mean square error of a layer estimate at an output of the unbiased linear MMSE MIMO equalizer.

2. The evaluation apparatus of claim 1, wherein an EVM definition used to calculate the plurality of per-layer EVM values of the transmitter is independent of the propagation channel when a channel matrix H of the propagation channel is invertible.

3. The evaluation apparatus of claim 2, wherein the EVM definition used to calculate the plurality of per-layer EVM values of the transmitter is a function of a precoding matrix associated with the multiple-layer MIMO signal.

4. The evaluation apparatus of claim 1, wherein the multiple-layer MIMO signal corresponds to a two-layer MIMO transmission, wherein the mean square error for each transmission layer is a function of the covariance of transmitter noise of the transmitter.

5. The evaluation apparatus of claim 4, wherein the per-layer EVM value of a first transmission layer is calculated as $$EVM_1 = 100 \cdot \sqrt{\frac{1}{|Q_{1,1}|^2}(|Q_{1,2}|^2 + P_{1,1})},$$

wherein the per-layer EVM value of a second transmission layer is calculated as $$EVM_2 = 100 \cdot \sqrt{\frac{1}{|Q_{2,2}|^2}(|Q_{2,1}|^2 + P_{2,2})},$$

wherein the values $Q_{1,1}$, $Q_{1,2}$, $Q_{2,1}$, $Q_{2,2}$, form a matrix Q which denotes the unbiased linear MMSE MIMO equalizer, and wherein the values $P_{1,1}$, $P_{2,2}$, are values from a matrix P which denotes the noise covariance matrix.

6. The evaluation apparatus of claim 1, wherein the transmitter comprises a User Equipment ("UE") for transmitting uplink MIMO signals to a base station, wherein the at least one processor is configured to cause the evaluation apparatus to define a noise floor of the base station due to transmitter noise based at least in part on the calculated EVM.

7. The evaluation apparatus of claim 1, wherein the multiple-layer MIMO signal comprises per-layer reference symbols or per-antenna reference symbols.

8. A method for calculating an error vector magnitude ("EVM") of a transmitter, the method comprising:
receiving a multiple-layer Multiple-Input, Multiple-Output ("MIMO") signal from a transmitter via a propagation channel;
measuring the multiple-layer MIMO signal using an unbiased linear minimum mean square error ("MMSE") MIMO equalizer; and
calculating an error vector magnitude ("EVM") of the transmitter based on a noise covariance matrix for the unbiased linear MMSE MIMO equalizer and further based on a plurality of per-layer EVM values corresponding to the multiple-layer MIMO signal, wherein the per-layer EVM value for each transmission layer is calculated as 100 times a square root of a mean square error of a layer estimate at an output of the unbiased linear MMSE MIMO equalizer.

9. The method of claim 8, wherein an EVM definition used to calculate the plurality of per-layer EVM values of the transmitter is independent of the propagation channel when a channel matrix H of the propagation channel is invertible.

10. The method of claim 9, wherein the EVM definition used to calculate the plurality of per-layer EVM values of the transmitter is a function of a precoding matrix associated with the multiple-layer MIMO signal.

11. The method of claim 8, wherein the multiple-layer MIMO signal corresponds to a two-layer MIMO transmission, wherein the mean square error for each transmission layer is a function of the covariance of transmitter noise of the transmitter.

12. The method of claim 11, wherein the plurality of per-layer EVM values of a first transmission layer is calculated as $$EVM_1 = 100 \cdot \sqrt{\frac{1}{|Q_{1,1}|^2}(|Q_{1,2}|^2 + P_{1,1})},$$

wherein the plurality of per-layer EVM values of a second transmission layer is calculated as $$EVM_2 = 100 \cdot \sqrt{\frac{1}{|Q_{2,2}|^2}(|Q_{2,1}|^2 + P_{2,2})},$$

wherein the values $Q_{1,1}$, $Q_{1,2}$, $Q_{2,1}$, $Q_{2,2}$, form a matrix Q which denotes the unbiased linear MMSE MIMO equalizer, and wherein the values $P_{1,1}$, $P_{2,2}$, are values from a matrix P which denotes the noise covariance matrix.

13. The method of claim 8, wherein the transmitter comprises a User Equipment ("UE") for transmitting uplink MIMO signals to a base station, the method further comprising defining a noise floor of the base station due to transmitter noise based at least in part on the calculated EVM.

14. The method of claim 8, wherein the generated multiple-layer MIMO signal comprises per-layer reference symbols or per-antenna reference symbols.

15. A system comprising:
a transmitting device that:
   generates a multiple-layer transmission signal for Multiple-Input, Multiple-Output ("MIMO"); and
   transmits the generated multiple-layer transmission signal via a propagation channel using a transmitter; and
an evaluation device that:
   measures the transmitted multiple-layer transmission signal using an unbiased linear minimum mean square error ("MMSE") MIMO equalizer; and
   calculates an error vector magnitude ("EVM") of the transmitter based on a noise covariance matrix for the unbiased linear MMSE MIMO equalizer and further based on a plurality of per-layer EVM values corresponding to the multiple-layer MIMO signal, wherein the per-layer EVM value for each transmission layer is calculated as 100 times a square root of a mean square error of a layer estimate at an output of the unbiased linear MMSE MIMO equalizer.

16. The system of claim 15, wherein an EVM definition used to calculate the plurality of per-layer EVM values of the transmitter is independent of the propagation channel when a channel matrix H of the propagation channel is invertible.

17. The system of claim 16, wherein the EVM definition used to calculate the plurality of per-layer EVM values of the transmitter is a function of a precoding matrix used to generate the multiple-layer transmission signal.

18. The system of claim 15, wherein the multiple-layer transmission comprises a two-layer MIMO transmission, wherein the mean square error for each transmission layer is a function of the covariance of transmitter noise of the transmitter.

19. The system of claim 18, wherein the plurality of per-layer EVM values of a first transmission layer is calculated as $$EVM_1 = 100 \cdot \sqrt{\frac{1}{|Q_{1,1}|^2}(|Q_{1,2}|^2 + P_{1,1})},$$

wherein the plurality of per-layer EVM values of a second transmission layer is calculated as $$EVM_2 = 100 \cdot \sqrt{\frac{1}{|Q_{2,2}|^2}(|Q_{2,1}|^2 + P_{2,2})},$$

wherein the values $Q_{1,1}$, $Q_{1,2}$, $Q_{2,1}$, $Q_{2,2}$, form a matrix Q which denotes the unbiased linear MMSE MIMO equalizer, and wherein the values $P_{1,1}$, $P_{2,2}$, are values from a matrix P which denotes the noise covariance matrix.

20. The system of claim 15, wherein the generated multiple-layer transmission signal comprises per-layer reference symbols or per-antenna reference symbols.

* * * * *